United States Patent
Miyashita

(10) Patent No.: US 9,950,637 B2
(45) Date of Patent: Apr. 24, 2018

(54) ARRAY COIL SYSTEM

(71) Applicant: PANASONIC INTELLECTUAL PROPERTY MANAGEMENT CO., LTD., Osaka (JP)

(72) Inventor: Norihiro Miyashita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 86 days.

(21) Appl. No.: 15/172,007

(22) Filed: Jun. 2, 2016

(65) Prior Publication Data

US 2016/0276876 A1    Sep. 22, 2016

Related U.S. Application Data

(63) Continuation of application No. PCT/JP2013/007155, filed on Dec. 5, 2013.

(51) Int. Cl.
| | |
|---|---|
| H01F 27/42 | (2006.01) |
| B60L 11/18 | (2006.01) |
| H02J 7/02 | (2016.01) |
| H02J 50/12 | (2016.01) |
| H02J 50/60 | (2016.01) |

(52) U.S. Cl.
CPC ............ *B60L 11/182* (2013.01); *H02J 7/025* (2013.01); *H02J 50/12* (2016.02); *H02J 50/60* (2016.02)

(58) Field of Classification Search
CPC . H02J 50/60; H02J 50/12; H02J 7/025; B60L 11/182

USPC .................................. 307/104; 320/107–115
See application file for complete search history.

(56) References Cited

U.S. PATENT DOCUMENTS

| | | | | |
|---|---|---|---|---|
| 5,367,242 A | * | 11/1994 | Hulman | G08B 3/1075 320/108 |
| 2006/0202665 A1 | * | 9/2006 | Hsu | H02J 5/005 320/139 |
| 2011/0285210 A1 | * | 11/2011 | Lemmens | H02J 5/005 307/104 |
| 2012/0181875 A1 | * | 7/2012 | Wechlin | B60L 3/00 307/104 |
| 2013/0099592 A1 | | 4/2013 | Abe | |

FOREIGN PATENT DOCUMENTS

| | | |
|---|---|---|
| CN | 103069689 A | 4/2013 |
| JP | 2004-342040 A | 12/2004 |
| JP | 2013-187579 A | 9/2013 |

OTHER PUBLICATIONS

International Search Report and Written Opinion issued in corresponding International Patent Application No. PCT/JP2013/007155, dated Feb. 18, 2014; with English translation.
Extended European Search Report issued in corresponding European Patent Application No. 13898714.4, dated Oct. 10, 2016.

* cited by examiner

*Primary Examiner* — Thomas Skibinski
(74) *Attorney, Agent, or Firm* — Greenblum & Bernstein, P.L.C.

(57) ABSTRACT

An array coil system includes a detector coil having a plurality of coils arranged in an array, and a plurality of resistances. Both terminals of each of the coils of the detector coil are connected to a ground or a DC voltage via associated ones of the resistances.

5 Claims, 5 Drawing Sheets

ARRAY COIL SYSTEM

CROSS-REFERENCE TO RELATED APPLICATIONS

This is a continuation of International Application No. PCT/JP2013/007155 filed on Dec. 5, 2013. The entire disclosure of this application is incorporated by reference herein.

BACKGROUND

The present disclosure relates to an array coil system in which a plurality of loop coils which are arranged in an array are fed with power.

Recently, wireless power transfer systems have been developed to perform non-contact charge of electric vehicles and other devices. Such a wireless power transfer system includes a power transmitting coil provided to a charging apparatus and a power receiving coil provided to an electric vehicle, and uses an electromagnetic induction method, thereby achieving non-contact and efficient power transfer. Since this wireless power transfer system that uses electromagnetic induction transfers a large amount of power, if a metallic foreign body has intruded in the system and is present between the power transmitting coil and the power receiving coil or near these coils, undesired heat may be generated. It is therefore important, for safety, to detect the presence of metal foreign bodies before performing charge.

A method which is in common use to address this problem is as follows: a detector coil for detecting metals is provided and the presence of a metallic object is detected based on change which electromagnetic induction between the metallic object and the detector coil causes in the inductance of the detector coil. According to this method, which is based on the electromagnetic induction, the detector coil is fed with power having a high-frequency component. However, if a plurality of detector coils are arranged above the power transmitting coil, interconnection between the detector coils deteriorates the detection performance.

Therefore, in order to reduce the adverse effect caused by the interconnection between coils, a technique to connect and disconnect the coils to and from a circuit which drives the coils by using switches has been used (see, for example, Japanese Unexamined Patent Publication No. 2004-342040).

SUMMARY

The technique of Japanese Unexamined Patent Publication No. 2004-342040, however, cannot reduce the adverse effect of the interconnection because parasitic capacitance that the coils have induces a current in the coils, even though the coils are disconnected from the circuit.

In view of the above problem of the known art, it is therefore an object of the present disclosure to provide an array coil system which is capable of reducing the adverse effect caused by the interconnection between coils of a detector coil.

To achieve the object, an array coil system of the present disclosure includes: a detector coil which includes a plurality of coils arranged in an array; and a plurality of resistances. Both terminals of each of the coils of the detector coil are connected to a ground or a DC voltage via associated ones of the resistances.

According to the present disclosure, the adverse effect of the interconnection between the coils of the detector coil can be reduced.

DETAILED DESCRIPTION

An embodiment of an array coil system according to an embodiment of the present disclosure will be described below with reference to the drawings. Note that the embodiment below is not intended to limit the scope of the present disclosure.

Figure 1:
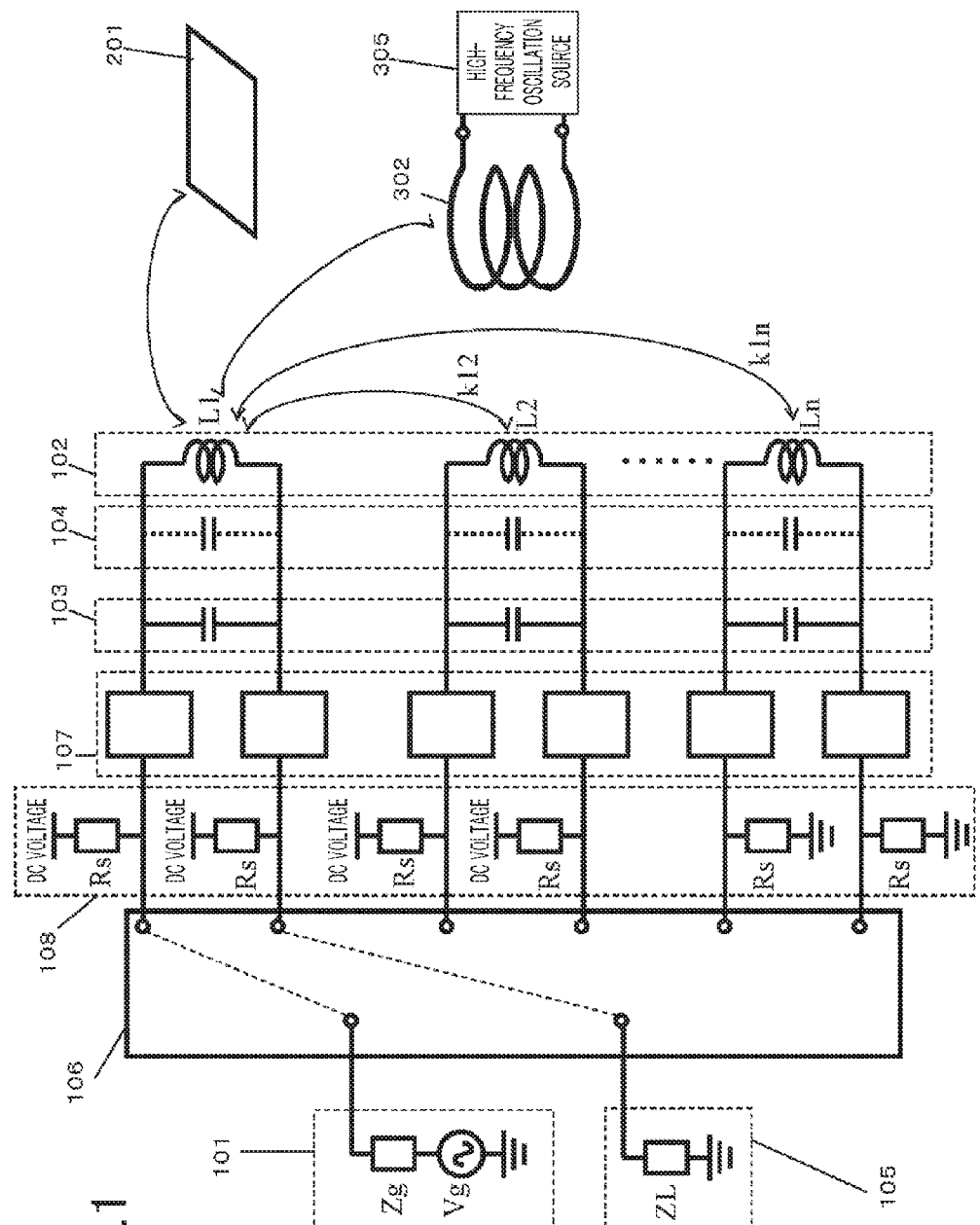
FIG. 1 shows a configuration of an array coil system according to an embodiment of the present disclosure.

FIG. 1 shows a configuration of an array coil system according to the embodiment of the present disclosure.

A transmission circuit 101 generates a high-frequency power having a predetermined frequency and outputs the power to a detector coil 102. The detector coil 102 is configured to generate a high-frequency magnetic field for detection of a metallic foreign body 201, and includes a plurality of coils arranged in an array. A resonant capacitive element 103 includes elements each of which is connected to both terminals of an associated one the coils of the detector coil 102, thereby forming a resonance circuit. The resonant capacitive element 103 is arranged near the detector coil 102 and connected to the detector coil 102. The system of the present disclosure performs detection by utilizing change which a detection target (a metallic object) causes in the inductance of the detector coil 102. Therefore, if the detector coil 102 were spaced away from the resonant capacitive element 103 and the wires connecting the detector coil 102 to the resonant capacitive element 103 had a large length, the wires would come to have inductance components. This would result in a decrease in the amount of change that the detection target causes in the inductance of the detector coil 102, and consequently, would lead to deterioration of the detection performance.

This embodiment is described based on a case where a parallel resonance circuit is formed. The detector coil 102 has parasitic capacitance 104, and in an equivalent circuit, the coils of the detector coil 102 have respective capacitive components which are parallel with each other.

The capacitance value of the resonant capacitive element 103 is set such that the frequency of the high-frequency power output by the transmission circuit 101 becomes substantially equal to the resonance frequency f0 of the resonance circuit comprised of the detector coil 102, the resonant capacitive element 103 and the parasitic capacitance 104. The detector coil 102 has no inductance component in a frequency domain which is higher than its self-resonant frequency (a resonance frequency caused by the inductance of the detector coil 102 and the parasitic capacitance 104). For this reason, the frequency of the high-frequency power output by the transmission circuit 101 is set to a value lower than the self-resonant frequency of the detector coil 102. A detection circuit 105 receives the high-frequency power output by the transmission circuit 101 via the detector coil 102, and detects the metallic foreign body 201 on the basis of change in the amount of received power. A switch circuit 106 performs switching to select one coil to be fed with power, from the coils of the detector coil 102 that are arranged in an array.

Figure 2:
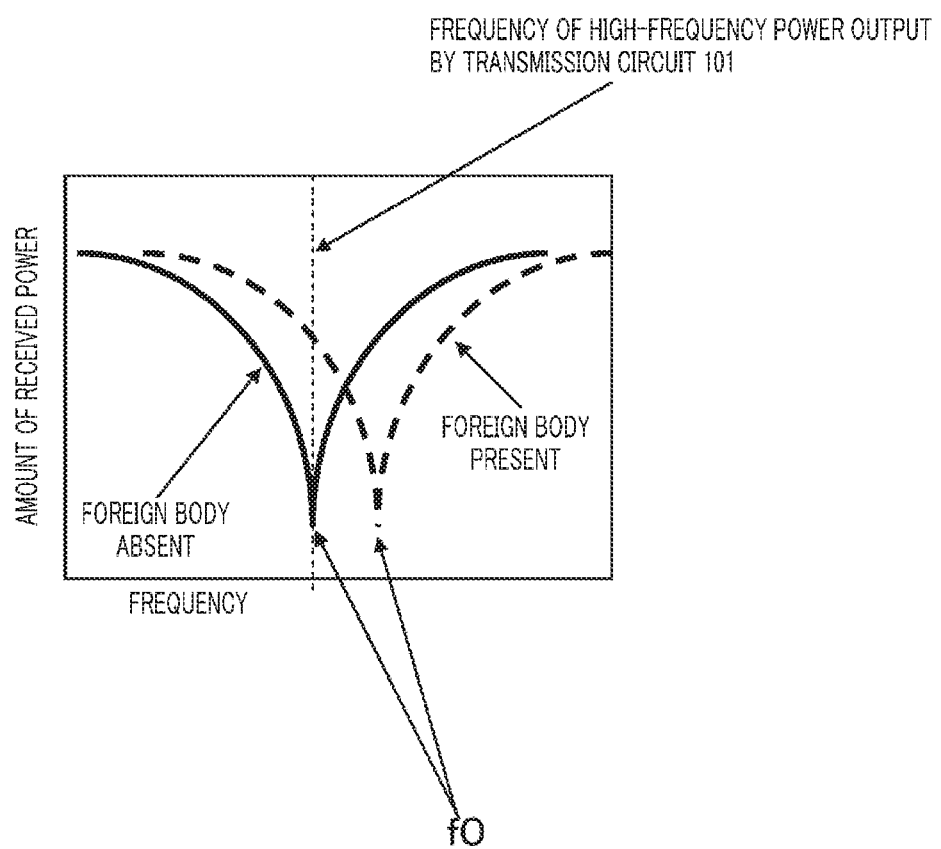
FIG. 2 shows change which a foreign body causes in an amount of received power, in an embodiment of the present disclosure.

FIG. 2 shows the change that the foreign body causes in the amount of received power. If the foreign body 201 is not present near the detector coil 102, under the condition that the frequency of the high-frequency power output by the transmission circuit 101 is substantially equal to the resonance frequency f0, the amount of received power has a small vale due to parallel resonance. If the foreign body 201 is present near the detector coil 102, electromagnetic induction is generated between the detector coil 102 and the foreign body 201, which reduces the inductance of the detector coil 102. This leads to an increase in the resonance frequency f0, and the amount of received power increases, as compared to the case where the foreign body 201 is not present. The metallic foreign body 201 is detected based on this change in the amount of received power.

Figure 3:
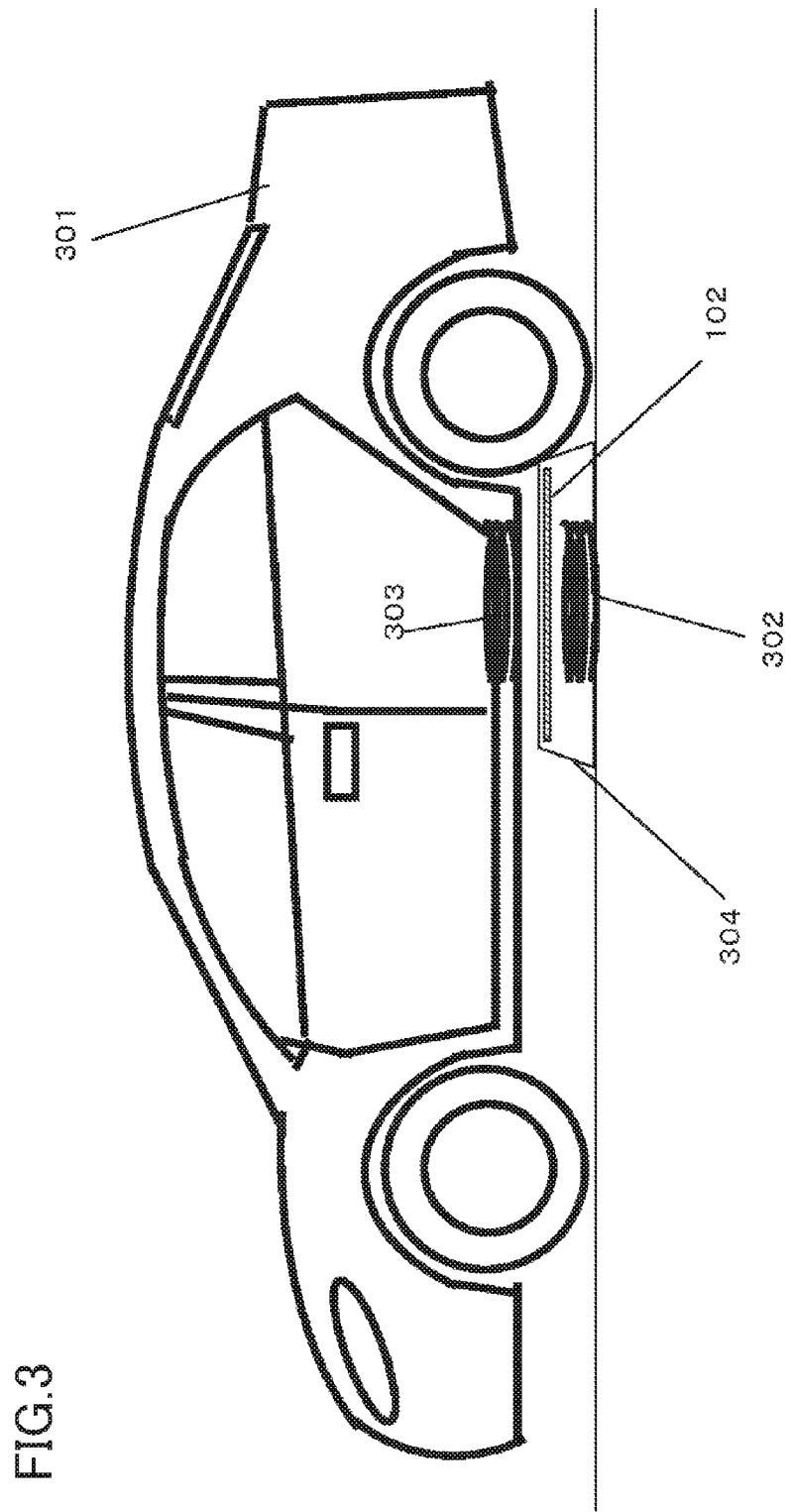
FIG. 3 shows an example in which a wireless power transfer system is mounted to a vehicle.

FIG. 3 shows an example in which a wireless power transfer system is mounted to a vehicle 301. In this example, a power transmitting coil 302 is provided near the ground and the power receiving coil 303 is provided to the vehicle 301. The power transmitting coil 302 is housed in a power transmitting coil case 304. The detector coil 102 is arranged above the power transmitting coil 302 and housed in the power transmitting coil case 304.

Figure 4:
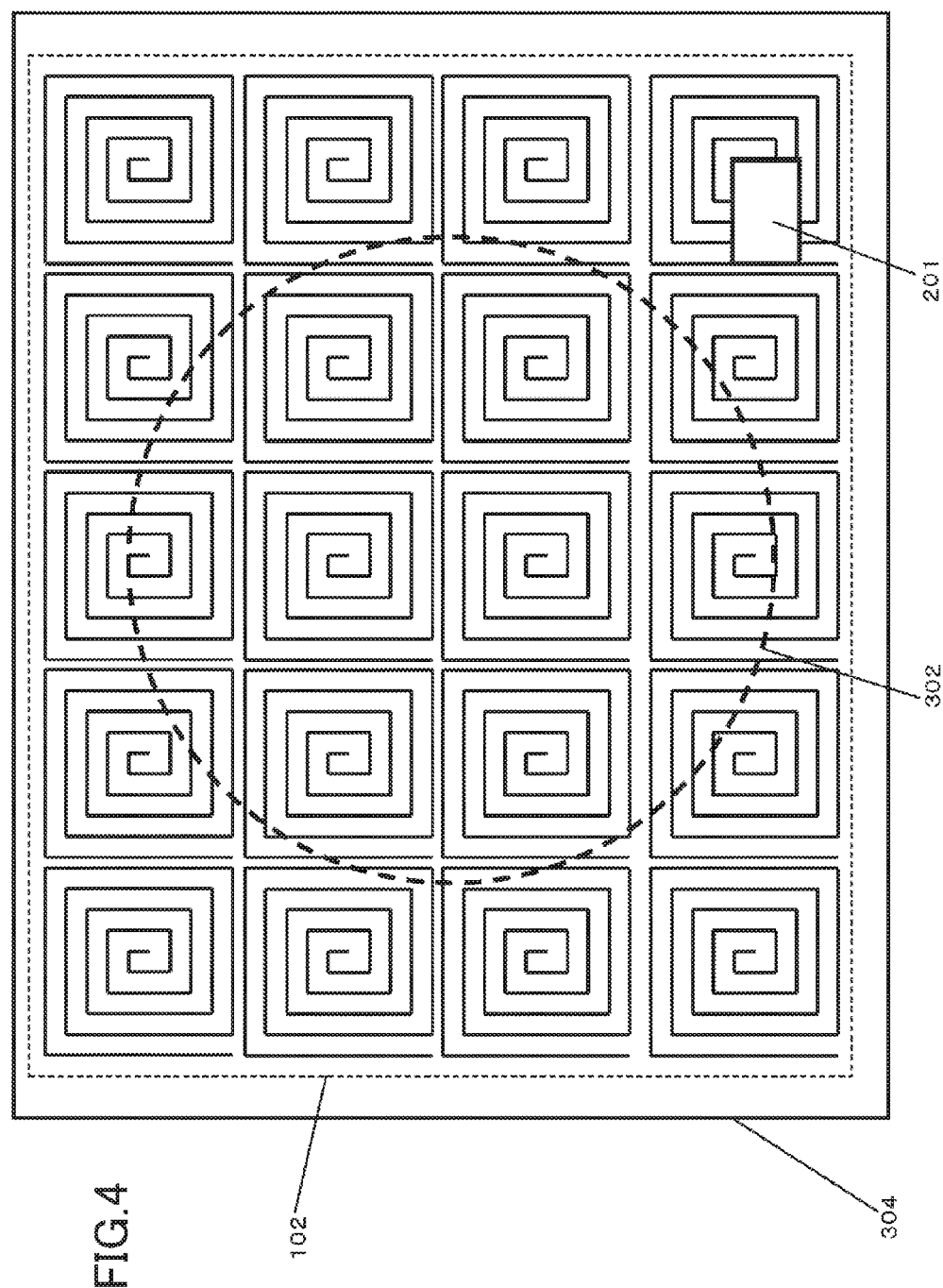
FIG. 4 shows a power transmitting coil case according to an embodiment of the present disclosure, as viewed from above.

FIG. 4 shows the power transmitting coil case 304, as viewed from above. To detect the metallic foreign body that is present above the power transmitting coil 302 or in a surrounding area of the power transmitting coil 302, the coils of the detector coil 102 are arranged in an array so as to cover the power transmitting coil 302 and the surrounding area of the power transmitting coil 302, without leaving any clearance. The switch circuit 106 performs switching between the coils of the detector coil 102, thereby detecting the foreign body 201 that is present above the power transmitting coil 302 or in the surrounding area of the coil 302.

Figure 5:
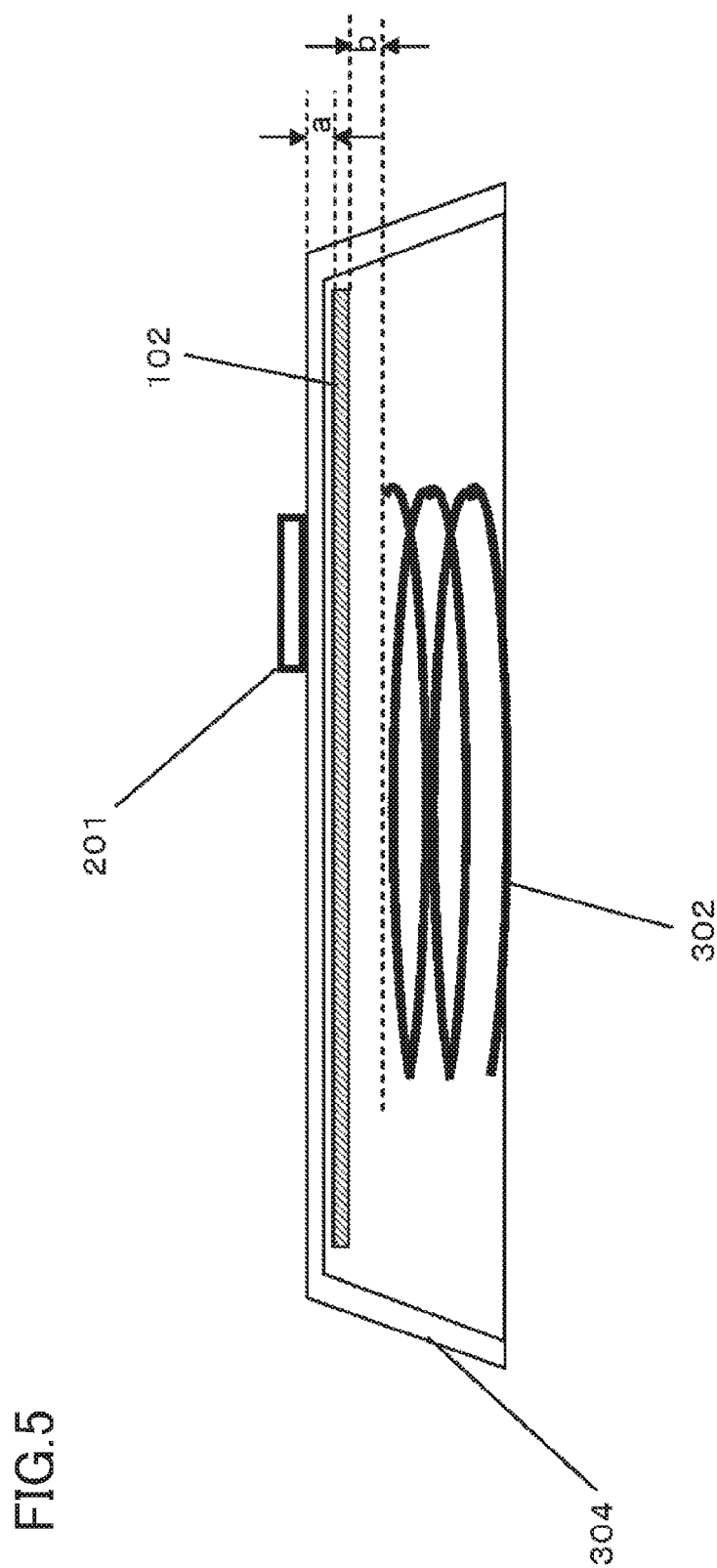
FIG. 5 is a cross-sectional view of a power transmitting coil case according to an embodiment of the present disclosure.

In FIG. 1, the detector coil 102 is magnetically coupled to not only the foreign body 201 but also the power transmitting coil 302 that is arranged near the coil 102, and a current is induced in the power transmitting coil 302. The coupling between the detector coil 102 and the power transmitting coil 302 leads to a decrease in the change that the foreign body 201 causes in the amount of received power, which deteriorates the detection performance FIG. 5 is a cross-sectional view of the power transmitting coil case 304. In order to reduce the coupling between the detector coil 102 and the power transmitting coil 302, it is preferred to arrange the detector coil 102 such that the distance a from the foreign body 201 to the detector coil 102 (the distance from the surface of the power transmitting coil case 304 to the detector coil 102) becomes shorter than the distance b from the power transmitting coil 302 to the detector coil 102.

Referring to FIG. 1, the high-frequency oscillation source 305 feeds high-frequency power having a predetermined frequency to the power transmitting coil 302 in order to perform non-contact charge. Since the high-frequency oscillation source 305 transfers a large amount of power, if the detector coil 102 and the power transmitting coil 302 become magnetically coupled to each other, the transmission circuit 101, the detection circuit 105 and the switch circuit 106 receive a large amount of power and may be destroyed. For this reason, the frequency of the high-frequency power output by the transmission circuit 101 is set to be different from the frequency of the high-frequency power output by the high-frequency oscillation source 305. Further, a circuit protection filter 107 is inserted between the switch circuit 106 and the detector coil 102. The circuit protection filter 107 is characterized as allowing the frequency of the high-frequency power output by the transmission circuit 101 to pass therethrough and as blocking the frequency of the high-frequency power output by the high-frequency oscillation source 305. This may protect the transmission circuit 101, the detection circuit 105 and the switch circuit 106.

Furthermore, in order to reduce the magnetic coupling between the detector coil 102 and the power input to transmitting coil 302 and diminish the power input to the transmission circuit 101, the detection circuit 105 and the switch circuit 106, each of the coils of the detector coil 102 is designed to have a smaller dimension than the power transmitting coil 302, as shown in FIG. 4.

It will now be described how the array coil system having the above configuration operates.

As shown in FIG. 4, since the coils of the detector coil 102 are arranged closed to one another, they are magnetically coupled to one another. In FIG. 1, if L1 of the coils of the detector coil 102 is selected, unselected coils, i.e., the coils except L1 are coupled to L1, and a current is induced. Consequently, the change that the foreign body 201 causes in the amount of received power decreases, and the detection performance is deteriorated. Further, since the unselected coils are connected to the capacitive element, resonance is produced and a large current is induced in the unselected coils. Therefore, it is necessary, for improvement of the detection performance, to reduce the current induced in the unselected coils.

In view of the foregoing, according to the present disclosure, both terminals of each of the coils of the detector coil 102 are connected to a ground or a DC voltage via an associated ones of resistances included in a resistance 108. The resistances of the resistance 108 are connected to both terminals of the unselected coils of the detector coil 102, and the Q value of the resonance circuit that the unselected coils form is reduced. As a result, the increase in the current induced by the resonance can be reduced.

In the foregoing manner, the array coil system of the present disclosure can reduce the adverse effect of the interconnection between the coils of the detector coil.

The array coil system of the present disclosure is applicable to foreign body detection systems of non-contact charging apparatuses for portable devices and electric vehicles, and to wireless devices including multiple coils (loop antennas) such as a wireless tag reader/writer.

What is claimed is:
1. An array coil system, comprising:
  a detector coil, which includes a plurality of coils arranged in an array;
  a plurality of resistances, wherein one resistance of the plurality of resistances is connected to each terminal of each coil of the plurality of coils;
  a resonant capacitive element connected between both terminals of an associated one of the plurality of coils of the detector coil;
  a transmission circuit that generates high-frequency power having a predetermined frequency and outputs power to the detector coil; and a switch circuit that performs switching to select, from the plurality of coils of the detector coil, one coil to be fed with the power generated by the transmission circuit, wherein both terminals of a coil of the detector coil, which is neither selected by the switch circuit, nor connected to the transmission circuit, are connected to a ground or a DC voltage via associated resistances of the plurality of resistances.

2. The array coil system of claim 1, wherein a resonant capacitive element that forms part of a resonance circuit is connected between both terminals of an associated one of the coils of the detector coil, and the resonant capacitive element is arranged near the detector coil and connected to the detector coil.

3. The array coil system of claim 1, further comprising:

a transmission circuit which generates high-frequency power having a predetermined frequency and outputs the power to the detector coil; and a high-frequency oscillation source which feeds high-frequency power having a predetermined frequency to a power transmitting coil so as to perform non-contact charge, wherein the frequency of the high-frequency power output by the transmission circuit is set to be different from the frequency of the high-frequency power output by the high-frequency oscillation source, and a circuit protection filter, which is characterized as allowing the frequency of the high-frequency power output by the transmission circuit to pass therethrough and as blocking the frequency of the high-frequency power output by the high-frequency oscillation source, that is connected to the detector coil.

4. The array coil system of claim 1, wherein each of the coils of the detector coil is designed to have a smaller dimension than a power transmitting coil.

5. The array coil system of claim 1, further comprising:

a power transmitting coil case which houses a power transmitting coil, wherein the detector coil is arranged above the power transmitting coil and housed in the power transmitting coil case, and the detector coil is arranged such that a distance from a surface of the power transmitting coil case to the detector coil is shorter than a distance from the power transmitting coil to the detector coil.

* * * * *